Figure 1:
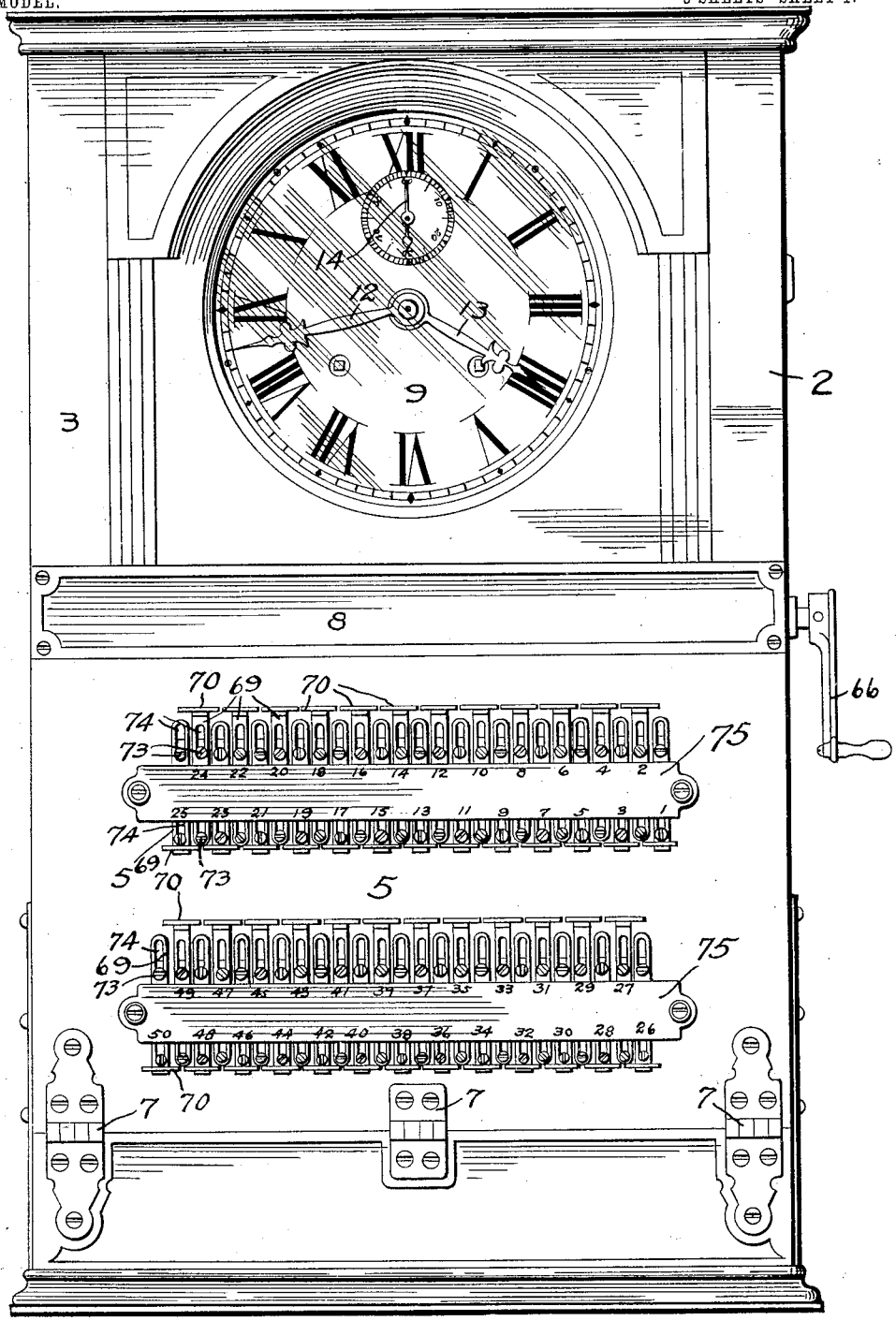

No. 744,173. PATENTED NOV. 17, 1903.
S. A. DEAN.
TIME RECORDER.
APPLICATION FILED MAR. 22, 1902.
NO MODEL. 5 SHEETS—SHEET 1.

WITNESSES
E. J. Staude
C. G. Hanson

INVENTOR
Seward A. Dean
BY Paul & Paul
his attorneys

No. 744,173. PATENTED NOV. 17, 1903.
S. A. DEAN.
TIME RECORDER.
APPLICATION FILED MAR. 22, 1902.
NO MODEL. 5 SHEETS—SHEET 2.

WITNESSES
E. G. Staude
O. G. Hanson

INVENTOR
Seward A. Dean
BY Paul & Paul
his attorneys

No. 744,173. PATENTED NOV. 17, 1903.
S. A. DEAN.
TIME RECORDER.
APPLICATION FILED MAR. 22, 1902.
NO MODEL. 5 SHEETS—SHEET 3.
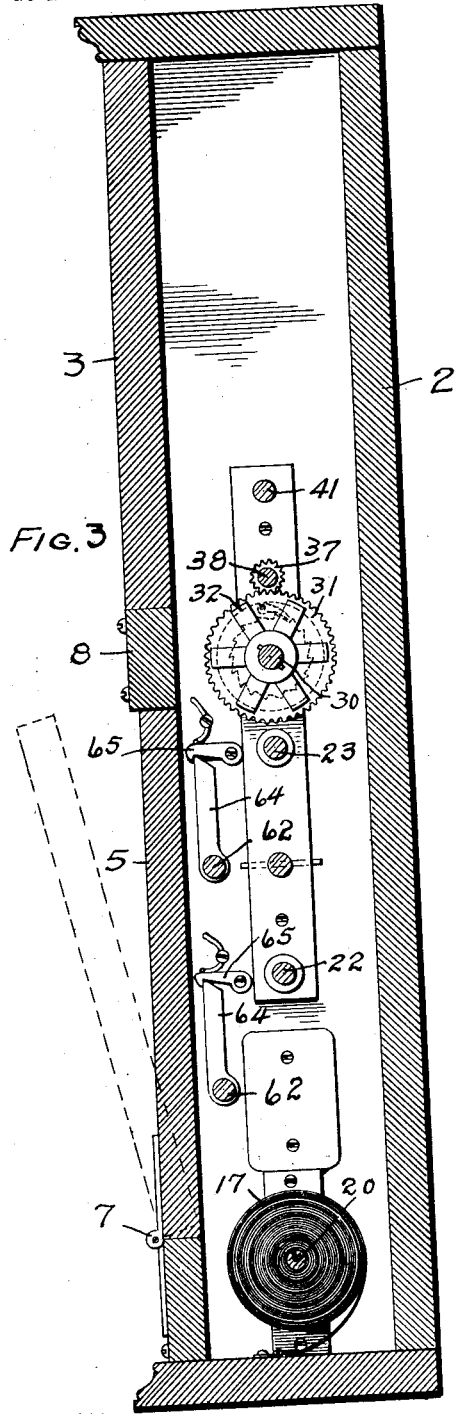
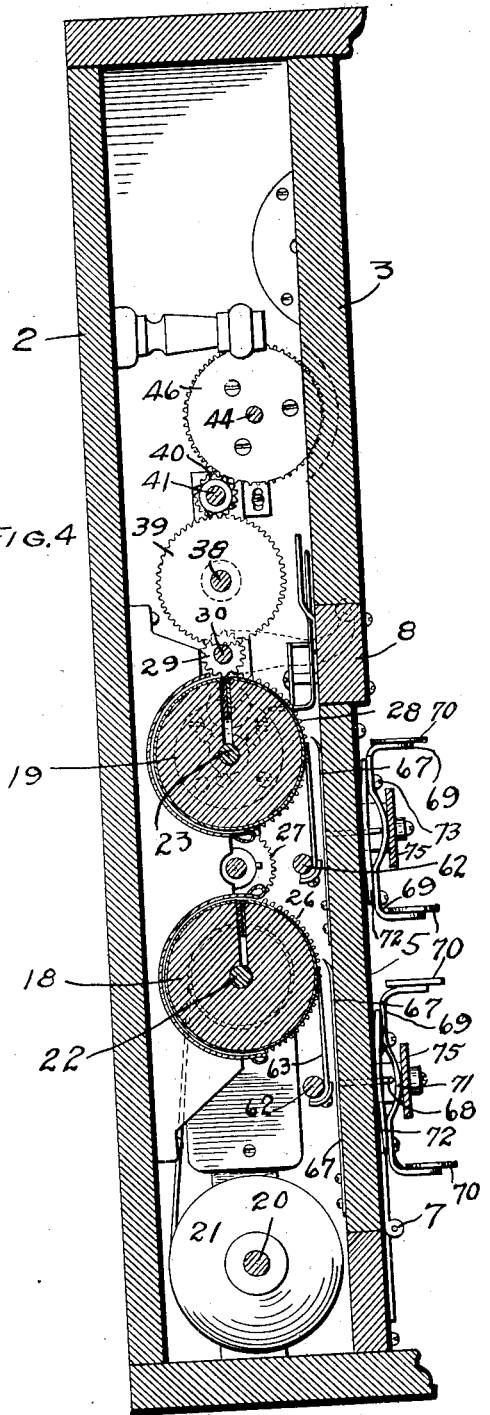
FIG. 3
FIG. 4
WITNESSES
E. G. Staude
C. G. Hanson
INVENTOR
Seward A. Dean
BY Paul & Paul
his attorneys

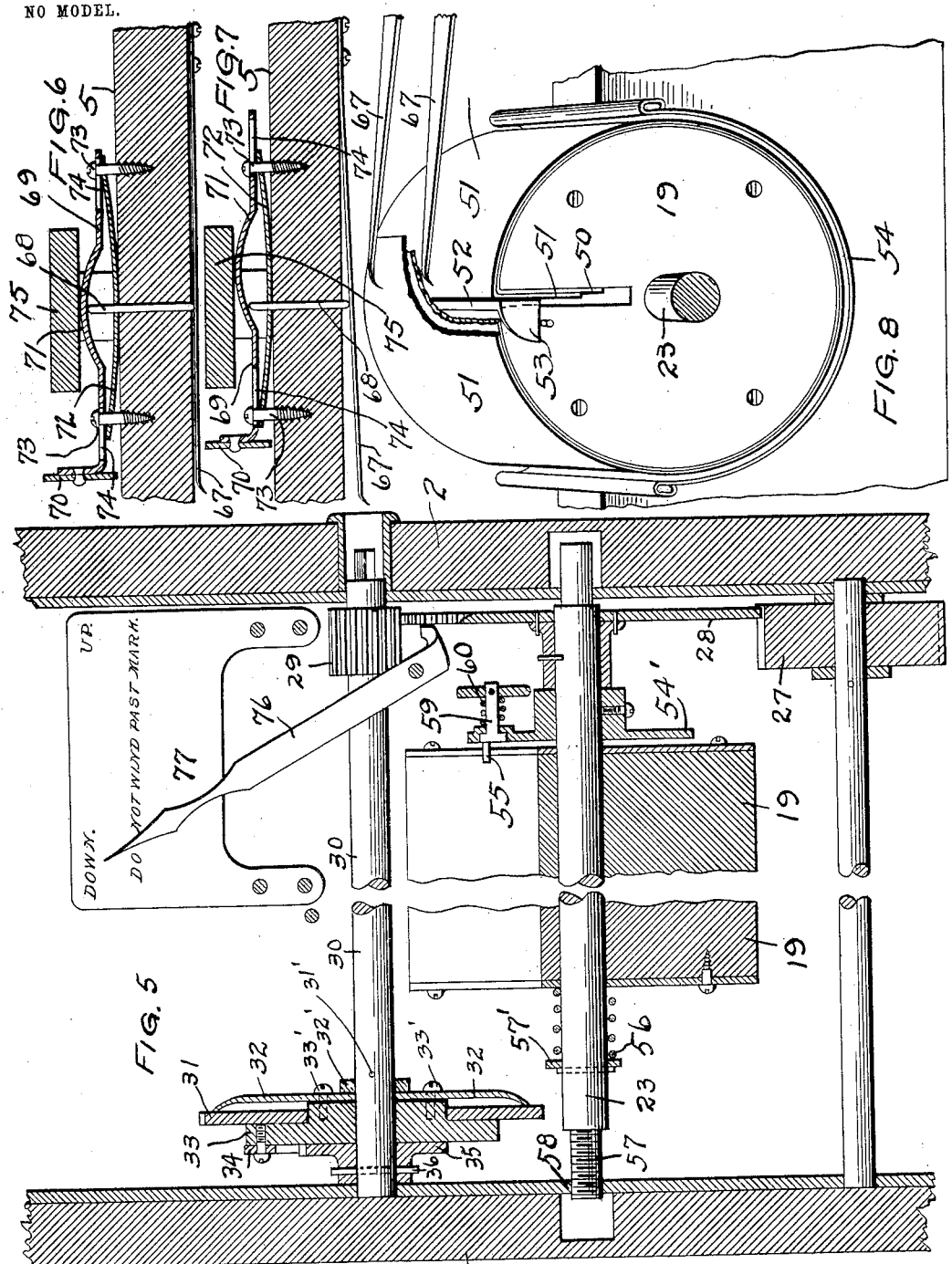

No. 744,173. PATENTED NOV. 17, 1903.
S. A. DEAN.
TIME RECORDER.
APPLICATION FILED MAR. 22, 1902.
NO MODEL. 5 SHEETS—SHEET 5.
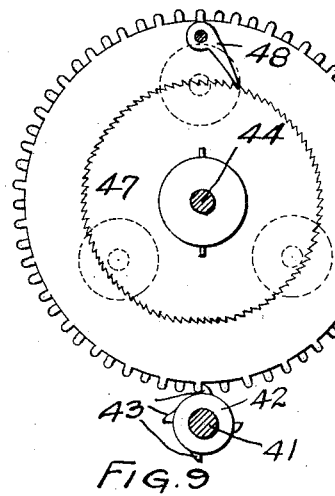
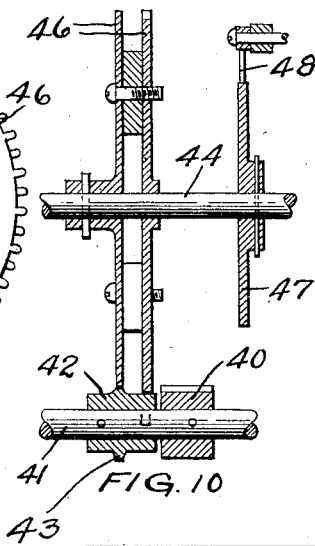
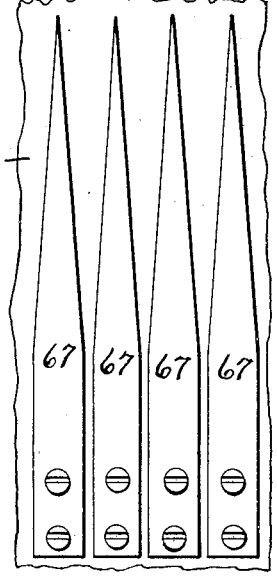
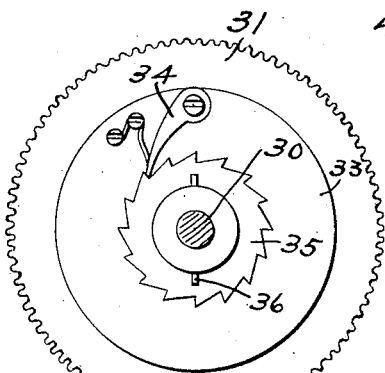
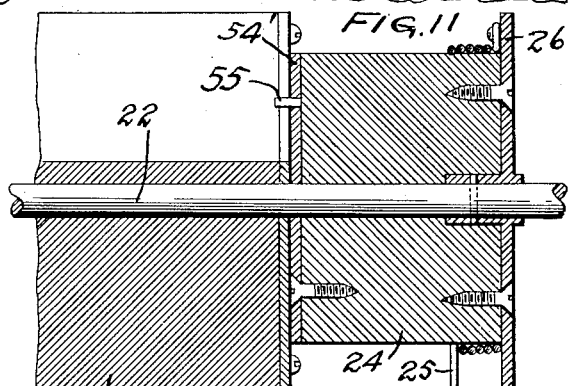
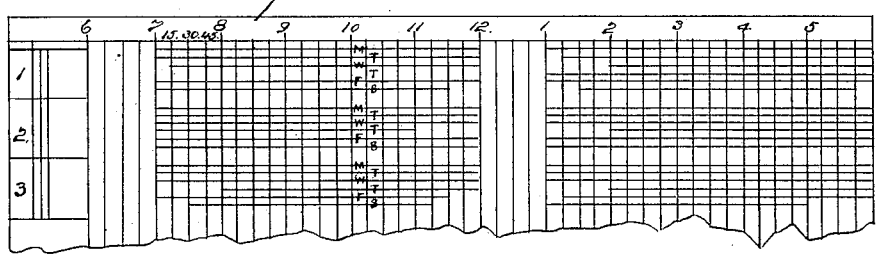
WITNESSES
E. G. Staude
C. G. Hanson
INVENTOR
Seward A. Dean
BY Paul & Paul
his attorneys No. 744,173.                                              Patented November 17, 1903.

UNITED STATES PATENT OFFICE.

SEWARD A. DEAN, OF MINNEAPOLIS, MINNESOTA.

TIME-RECORDER.

SPECIFICATION forming part of Letters Patent No. 744,173, dated November 17, 1903.

Application filed March 22, 1902. Serial No. 99,396. (No model.)

*To all whom it may concern:*

Be it known that I, SEWARD A. DEAN, of Minneapolis, in the county of Hennepin, State of Minnesota, have invented certain new and useful Improvements in Time-Recorders, of which the following is a specification.

This invention relates to improvements in recorders designed to be used by employees for the purpose of making a record showing the time when each employee enters or leaves the place where he is employed.

The invention may also be used as a time-recorder for watchmen, showing the time when they make their rounds.

The object of my present invention is to provide a time-recorder which may be operated without the use of keys, which will be of the simplest possible construction, which will be absolutely accurate as to time, which may be set and cared for by a person not an expert in its use, and which will present a record-sheet from which the results may be figured much more expeditiously than with the record-sheets of the ordinary time-recorders in present use.

My invention consists generally, first, in providing a double sprocket and flier between the motor and the clock mechanism, thus providing a firmer hold on the sprocket-teeth than would be possible if a single sprocket-wheel and single flier were used; second, in providing a fine ratchet in connection with the sprocket-wheel, thus preventing any backward movement being imparted to the clock; third, in providing a winding-arbor between the gear-trains having a ratchet-wheel and friction device and permitting the motor to be wound or unwound and the cylinder to be set at any desired place; fourth, in providing means for securing horizontal movement of the cylinder; fifth, in means for attaching the cylinder to the cylinder-arbor; sixth, mechanism for winding the motor and simultaneously returning the rolls to the left or advance rolls to the right at one operation, none of the parts being thrown out of gear; seventh, means for holding the paper tight against the roll; eighth, in providing, with a carbon-sheet and record-sheet, markers bearing against the carbon and means for producing a step-by-step motion of the cylinder, and, ninth, the invention consists, further, in the constructions and combinations hereinafter described, and particularly pointed out in claims.

Figure 2:
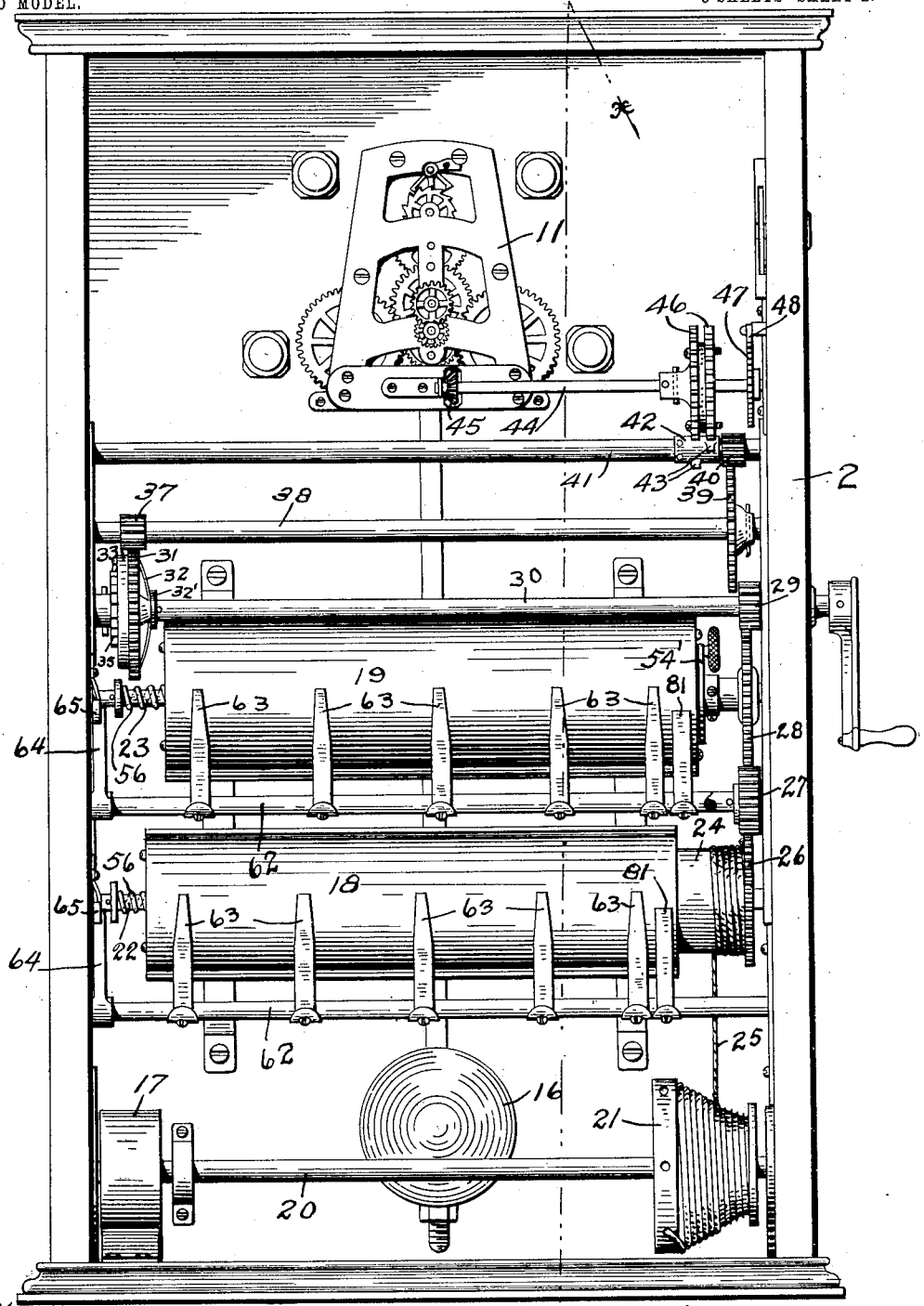

In the accompanying drawings, forming part of this specification, Figure 1 is a front elevation of a machine embodying my invention. Fig. 2 is a similar view with the front plates or doors of the machine removed and with the clock dials and hands removed. Fig. 3 is a longitudinal vertical section looking from the right in Fig. 2. Fig. 4 is a similar section taken on line X X of Fig. 2. Fig. 5 is a detail of a part of the motor-operated mechanism. Figs. 6 and 7 are details of the markers. Fig. 8 is a detail perspective view of the paper-holding cylinder. Figs. 9 and 10 are details of the sprocket-wheels and fliers and showing also the pawl and ratchet for preventing any reverse movement of the shaft. Fig. 11 is a detail of the markers. Fig. 12 is a detail of the friction-disk and ratchet. Fig. 13 is a detail of the paper-holding cylinder. Fig. 14 is a partial plan view of one of the record-sheets.

In the drawings, 2 represents the casing of the machine, which may be of any suitable size or construction. It is preferably provided with an open front having a horizontal swinging door 3 and a door 5, secured by hinges 7 and adapted to be dropped down into a horizontal position, so as to permit free access to the interior of the machine. The casing may also be provided with the plate 8, arranged between the doors 3 and 5. The door 3 is preferably provided with a circular opening to receive a lock-dial 9. The clock mechanism 11, arranged within the casing back of the opening in the door 3, may be of any preferred or ordinary type. This clock mechanism is provided with the dial 9 and with the usual hands 12, 13, and 14. The clock is also provided with a suitable pendulum 16, which is adapted to swing freely in the casing and which controls the clock-movement in the usual way.

Arranged below the clock mechanism 11 is a motor consisting of an operating-spring and suitable gearing connected to said clock mechanism, said motor being also provided with suitable recording-rolls arranged to be operated by said motor and adapted to carry the paper upon which the record is to be made.

This motor is connected with the clock mechanism, so as to be regulated or controlled thereby, and it can be operated only so fast as is permitted by the operation of the clock. The motor consists, primarily, of a suitable actuating-spring 17, a train of gears connected to and regulated by said clock mechanism, and certain recording-cylinders 18 and 19, which are operated by said motor and which are adapted to carry the sheets of paper upon which the records are to be made. The spring 17 has one end secured to the casing of the machine, and the other end of the spring is connected to a suitable driving-shaft 20, that is mounted in suitable bearings in the casing 2. This shaft is provided with the conical pulley or fusee 21. The cylinders 18 and 19 are mounted upon shafts 22 and 23, and the shaft 22 is provided with a barrel 24, and a cord 25 connects this barrel with the fusee 21. As the spring 17 uncoils the cord 25 is wound from the barrel 24 onto the fusee or conical pulley 21. When the spring is wound up, the cord is wound onto the barrel 24 and extends from said barrel to the larger part of the fusee 21. As the spring uncoils and its tension decreases the cord follows down in the spiral groove in the fusee 21, and as the diameter of the part of the pulley from which the cord extends is constantly decreasing the power exerted through the cord on the barrel 24 and the mechanism connected therewith remains constant. The shaft 22 is provided with a spur-gear 26, that engages a pinion 27, and this pinion engages a gear 28 on the shaft 23. It also engages a pinion 29 on the winding-shaft 30. A disk 33 is mounted loosely upon the shaft 30 and is provided with a projecting hub, upon which is also mounted loosely the gear 31. Springs 32 are secured to the hub of the disk 33 and bear upon the face of the gear 31 and press said gear against the face of the disk 33. Suitable screws 33' pass through the springs 32 and enter the hub of the disk 33. A collar 32' is arranged against the springs 32, and a pin 31' passes through the shaft 30 and holds said collar in place. A ratchet-wheel 35 is secured to the shaft 30 by a pin 36 or by other suitable means. This ratchet-wheel is arranged against the disk 33, and said disk carries a pawl 34, that engages said ratchet-wheel. The gear 31 meshes with a pinion 37 upon a shaft 38, parallel with the shaft 30, and this shaft carries a gear 39, meshing with a pinion 40 upon a shaft 41. The shaft 41 has the double flier or escapement 42, consisting of a sleeve secured upon the shaft and having a series of spurs or projections 43. These spurs are staggered or arranged so that the spurs of one row come opposite the spaces between the spurs of the other row. A shaft 44, arranged preferably parallel with the shaft 41, is provided with a beveled pinion 45, that engages one of the gears of the clock-train, whereby the shaft 44 is driven by said clock mechanism. This shaft has secured to it the double sprocket-wheel 46, arranged to be engaged by the flier 42. The shaft 44 is also preferably provided with a fine-tooth ratchet-wheel 47, and a pawl 48, arranged upon a fixed support, engages this ratchet-wheel and prevents any backward movement of the shaft 44. With this mechanism it will be seen that the cylinder-operating motor has a step-by-step movement, being driven from the spring 17 and controlled by the flier or escapement 42. One of the teeth or projections 43 on the flier or escapement 42 will always be in engagement with a tooth of one of the sprocket-wheels 46. As the shaft 44 rotates slowly the sprocket-wheels 46 will be turned slowly, and when the tooth that is engaged by one of the projections, 43, has been sufficiently advanced said projection will slip off from the sprocket-wheel and the shaft 41 will rotate until the next projection, 43, in the other row strikes the tooth of the other sprocket-wheel 46. This permits the train of gears and the cylinder-carrying shafts operated by the motor-spring 17 to be advanced by a step-by-step motion regulated by the operation of the clock mechanism.

Each of the cylinders 18 and 19 is provided with a longitudinal slot adapted to receive one edge of the record-sheet 50 and also one edge of the carbon-sheet 51. (See Fig. 8.) The edge of the carbon-sheet and the edge of the record-sheet are secured in position in the slot by means of a lock-bar 52, having the flanged ends 53, this lock-bar being pushed into the slot after the insertion of the record-sheet and carbon-sheet, and thereby locking said sheets in position. The sheets are wrapped around the roll, the record-sheet being inside, and the other edge of each sheet is left free, as indicated in Fig. 8. A metallic shield 54, conforming to the outline of the cylinder and fitting closely to said cylinder, is arranged in the rear of each cylinder, and this shield tends to hold the record-sheet and the carbon-sheet in proper position upon the cylinder. (See Fig. 8.) The cylinders 18 and 19 are each mounted loosely upon the corresponding shaft, and a plate or disk 54' is secured upon the shaft at the end of the cylinder and carries a pin 55, adapted to engage the longitudinal slot in the cylinder, and thereby lock said cylinder in position upon the shaft, so as to cause it to rotate with the shaft. A spring 56 surrounds the shaft and bears at one end upon the cylinder and at the other end upon a pin 57', passing through the cylinder-shaft, and this spring tends to force the cylinder toward the plate 54' and to cause the slot in the cylinder to be engaged by the pin 55. By this means by moving the cylinder endwise upon its shaft it will be released from the pin 55, and it will then be in position to revolve freely upon the shaft, and it can be turned in either direction for the purpose of adjustment or for the inspection of the record-sheets upon the cylinder. As soon as the cylinder is released it is forced by the spring 56 against the disk 54', and as soon as the cylinder is turned so that the pin 55 is in line with the slot in the cylinder said pin drops into the slot, and thereby locks the cylinder in position upon its shaft. I also prefer to provide means whereby each shaft and its cylinder is advanced horizontally, as here shown toward the right, as it is rotated. As here shown, the shafts 22 and 23 are each provided with a left-hand screw-thread at its end 57, and this engages a corresponding thread or nut in the plate 58 at the end of the shaft. With this construction as the shafts 22 and 23 are rotated in one direction the cylinders will be advanced from left to right, the threaded end 57 of the shaft screwing out of the threaded plate 58. When the cylinder-shafts are rotated in the opposite direction, the threaded ends of the shafts screw into the openings and the cylinders are returned to their left-hand position, the threaded ends of the shafts entering recesses in the wall of the casing. It sometimes occurs that it is necessary to give a slight adjustment to one of the cylinders without destroying the position of the other. This I accomplish by placing the pin 55 eccentrically upon a rotating stud 59, surrounded by a spring 60. By turning the stud 59 the position of the cylinder may be varied within the limits of the throw of the eccentrically-placed pin 55, and thereby said cylinder may be slightly or partly adjusted. I have shown this attachment in connection with one of the cylinder-shafts only, it not being necessary to use it in connection with both cylinders.

Arranged below and preferably slightly in front of each of the cylinders 18 or 19 is a shaft or rod 62, each carrying a series of spring-fingers 63, adapted to fit closely against the outer surface of the cylinders or against the paper and carbon secured thereto to hold said paper and carbon in place. Each of these shafts is provided with a lug 64, adapted to engage a spring-hook 65, and thereby to lock said shafts in position with the spring-fingers 63 closely against the surface of the cylinder. By releasing the spring-dogs 65 the lug 64 may be operated to rotate the shaft 62 and turn the paper-holding arms from a substantially vertical to a horizontal position. This is done for the purpose of permitting free access to the cylinder in putting record-sheets on said cylinders or removing them therefrom. With the mechanism already described it will be seen that the cylinders 18 and 19 are rotated with a step-by-step motion, this motion being controlled by the clock and the escapement arranged between the shaft 44 and the shaft 41. As the cylinders 18 and 19 are rotated they are moved slowly toward the right by reason of the engagement of the left-hand screw-threaded ends of the shafts 22 and 23 with the threaded openings in the wall of the casing. The end of the shaft 30 is preferably square, and by means of a suitable key applied to said shaft the shaft may be rotated in either direction, and it may be turned in either direction without turning the shaft 38, the frictional connection between the shaft 30 and the gear 31 permitting this operation. Ordinarily the shaft 30 is driven through the train of gears described from the motor-spring 17. The disk 33 is driven positively by the ratchet, and the frictional contact between the disk 33, the springs 32, and the gear 31 is sufficient to cause said gear to be rotated with the disk 33 as said disk is rotated in one direction with the shaft by means of the ratchet 36 and pawl 34. When, however, a key is applied to the shaft 30, said shaft may be rotated in either direction without turning the gear 31. When the shaft 30 is turned in one direction, the ratchet 36 turns under the pawl 34, and when it is turned in the opposite direction the disk 33 and spring 32 slide over the gear 31. By turning the shaft 30 in one direction the shafts 23 and 22 and the barrel 24 are rotated so as to wind the cord 25 off from the fusee 21 and onto the barrel 24. This winds up the spring 17 and puts the same under tension. At the same time the shafts 22 and 23 are screwed into the threaded bearings at their ends and the cylinders 18 and 19 are moved slowly toward the left. With this construction I am enabled by means of the operating-key to either wind or unwind the motor without disconnecting any of the parts or throwing any of the parts out of gear. I may also in winding the motor automatically move the cylinders longitudinally of their axes, so as to bring them into proper position for beginning a new record.

When the door 5 is in its closed position, as shown in Fig. 4 of the drawings, its inner surface is quite close to the front of the cylinders 18 and 19, and I prefer to arrange upon this door a series of markers, each of which may be brought into contact with the carbon-sheet upon one of the cylinders, thereby causing a mark to be made upon the record-sheet that is arranged upon the cylinder beneath said carbon-sheet. The record-sheet that I prefer to use is shown in detail in Fig. 14. As here shown, the sheet is divided by a series of horizontal lines, and these lines are numbered to represent hours, half-hours, and quarter-hours. As each sheet is intended to be used for a week, there is sufficient space for a week's record for each operator. Upon the inside of the door 5 I provide two series of springs 67, one series of springs for each cylinder. These springs have pointed ends, as shown in Fig. 8. Normally these springs stand at a little distance from the front of the cylinders, so that as the cylinders are rotated the springs are not in contact with them. These springs constitute the markers for the record-sheets. In front of each spring is a short sliding stud 68, that is arranged in an opening in the door, with its inner end bearing against the spring or marker 67. The front of the door is provided with two series of numbered slides 69, each provided with finger-pieces 70 and having a double inclined surface 71, against which the outer end of the stud rests. Springs 72 are arranged beneath the slides 71, and said slides are preferably held in position by means of screws 73, passing through slots 74 in the slides over the springs 72 and entering the door. A bar 75 is preferably arranged in front of each series of slides, and consecutive numbers for the slides are preferably arranged upon these bars, as shown in Fig. 1 of the drawings. When the slides are in their elevated position, as indicated in Fig. 4 and in the detail drawing Fig. 6, the center of the double incline comes opposite the end of the stud 68, and said stud will then be pushed outward by the spring-marker 67, and said marker will stand against the inside of the door. When the slide is pushed downward, as shown in Fig. 7, the inclined surface of the slide forces the stud 68 inward, and thereby forces the spring-marker 67 against the surface of the cylinder or against the carbon-sheet arranged upon said cylinder. With the marker in this position as the cylinder is rotated the point of the marker, which stands in contact with the carbon-sheet, will press said sheet against the record-sheet, thereby making a fine line or mark upon said sheet.

I also prefer to provide an indicator that shows when the motor is wound up or to what extent it has run down. This indicator consists of a pointer 76, pivoted upon the frame of the machine, preferably upon the inside of the plate 8, and arranged to pass over a plate 77, also secured to the plate 8, and provided at its end with the words "Up" and "Down." As the motor is wound and the cylinders 18 and 19 are moved to the left by the engagement of their screw-threaded ends 57 with the threaded bearings the upper end of this pointer is moved to the right until it comes opposite the word "Up." As the motor is operated the upper end of the pointer gradually moves toward the left, and when the motor has run down the end of the pointer is opposite the word "Down."

The operation of the machine is as follows: To put the machine in condition for use, the key is placed upon the winding shaft or arbor 30 and said arbor is turned, and thereby, through the train of gears described, the two cylinder-shafts are rotated, and these shafts and the cylinders carried thereby are moved to the left by the engagement of the left-hand screw-threads on said shafts with the threaded bearings with which they are engaged. By the same operation the motor-shaft 20 is rotated so as to wind up the motor-spring 17. In doing this the cord 25 is wound off from the fusee 21 and is wound onto the barrel 24. During this operation the gear 31 and the disk 33 remain stationary, the ratchet-wheel 35 turning under the pawl or dog 34. The shaft 30 can be turned in the opposite direction by means of a key without turning the gear 31; but in this instance the disk 33 must turn with the ratchet. The springs 32 also turn with the disk 33, and these parts slide over the faces of the gear 31, permitting said gear to remain stationary. In order to place the record and carbon sheets upon the cylinders the door 5 is let down and the sheet-holding fingers 63 are turned down in a horizontal position. The cylinders 18 and 19 are then moved to the left against the tension of the spring 56, and thereby said cylinders are released from the pins 55. The cylinders may now be turned freely. Each cylinder is turned so as to bring the slot to the front. The sheet-holding bar 52 is removed and one each of the record-sheets and the carbon-sheets is inserted in the slot. The bar 52 is replaced, and the cylinder is rotated so as to wrap the sheets around it. The other end of each sheet is left free, as shown in Fig. 8. The sheets are held in position by the shield 54 and by the spring-fingers 63. An indicating-finger 81 is secured upon each of the shafts 62, and the upper edge of this finger indicates the horizontal line on the surface of the cylinder upon which the spring-markers will bear when they are forced inward against the cylinder. In placing the sheets upon the cylinders I adjust said sheets so that the markers will bear at the same points upon the two sheets and the records made thereon will be similar. By means of the eccentrically-placed pin 55 and its adjusting means I may turn one of the cylinders slightly, so as to secure the proper adjustment of the sheets. When the sheets are placed in position and the motor-spring is wound up, the machine is ready for operation. It is intended to be used for a week without change of the record-sheets. As before stated, when the motor-spring is wound the cylinders will be at their extreme left-hand position. When each employee enters the place of business in the morning, he will be required to move downward the slide corresponding to his number. This will force the corresponding marker inward against the carbon-sheet, and a fine mark or line will be made upon the record-sheet as the cylinder is rotated. The point at which this mark begins on the record-sheet will show the time at which the employee entered the factory or place of business. At any time that he leaves the factory—as, for instance, when he goes out at noon—he will raise the slide, thereby permitting the marker to move away from the carbon-sheet. When he returns, he will again press the slide downward, and the marker will again make a line upon the record-sheet. These lines will always be made while the employees are in the place of business, and there will be blank spaces when they are out. As the motor is in operation all of the time and as the cylinders are gradually being moved to the right, when the employees arrive at the place of business on the succeeding morning the cylinders will have been moved a short distance to the right, so as to present a new place upon the carbon-sheet to each marker. Each cylinder makes a complete revolution in twelve hours, and therefore after the carbon-sheets have been properly placed in the machine the time when each marker will be brought against the sheet will correspond to the time indicated upon said sheet by the horizontal lines thereon. These lines, as before stated, are marked to indicate hours, half-hours, and quarter-hours. At the end of the week the carbon and record sheets may be removed from the cylinders, and an exact record of the time when each employee was in the place of employment during the preceding week will be shown at a glance upon the record-sheet.

I do not limit myself to the details of the construction, as it is obvious that the same may be varied in many particulars without departing from my invention.

I claim as my invention and desire to secure by Letters Patent—

1. The combination, in a time-recorder, with a driving-motor, and a clock regulating said motor, of a record-sheet-holding cylinder arranged to be operated by said motor, and a threaded shaft upon which said cylinder is mounted, and by which it is moved longitudinally, and means for reversing the longitudinal movement of the cylinder as the motor is wound, substantially as described.

2. The combination, in a time-recorder, with a driving-motor, of a record-holding cylinder, a threaded arbor on which said cylinder is mounted, a clock regulating said motor, a gear-train connecting said clock and cylinder, an escapement and double sprocket wheel in said gear-train, a winding-arbor, and a ratchet-wheel and friction device mounted on said arbor within said gear-train, whereby said motor can be wound and said cylinder set at any desired point or returned to the starting-point by turning said winding-arbor, substantially as described.

3. The combination, in a time-recorder, with a driving-motor, and a clock regulating said motor, of one or more record-sheet-holding cylinders arranged to be operated by said motor, means for longitudinally advancing said cylinder or cylinders as the same are rotated by said motor, and means for reversing the longitudinal movement of said cylinders as said motor is wound, substantially as described.

4. The combination, in a time-recorder, with a driving-motor, and a clock regulating said motor, of a record-sheet-holding cylinder arranged to be operated by said motor, a winding-arbor and a friction-disk connected with said arbor and forming a part of said gear-train, substantially as described.

5. The combination, in a time-recorder, with a driving-motor, and a clock regulating said motor, of a winding-arbor forming part of the gear-train between said motor and said clock, a gear arranged upon said winding-arbor, a friction-disk connecting said gear with said arbor and forming a part of said train, and a record-sheet-holding cylinder, driven by said motor, and arranged between the motor-operating spring and said winding-arbor whereby as the motor is wound, the movement of the cylinder is reversed, substantially as described.

6. The combination, in a time-recorder, with a driving-motor, and a clock regulating said motor, of a record-sheet-holding cylinder arranged to be driven by said motor, and means for reversing the movement of said cylinder as said motor is wound, substantially as described.

7. The combination, with the spring-operated motor, and the regulating mechanism, of a record-cylinder, a shaft upon which said cylinder is mounted and is longitudinally movable, a pin for locking said cylinder upon said shaft and a spring holding said cylinder in engagement with said pin, substantially as described.

8. The combination, with the spring-actuated motor, of the record-holding cylinders, shafts upon which said cylinders are mounted, locking-pins for holding said cylinders upon said shafts, and means for adjusting one of said pins, for the purpose set forth.

9. The combination, with the spring-actuated motor, provided with a conical pulley or fusee, of a record-sheet-holding cylinder, a shaft upon which said cylinder is mounted, a barrel upon said shaft, a cord connecting said barrel with said fusee, a train of gears connected with the cylinder-shaft and a clock mechanism connected with said train of gears and serving to regulate said motor, substantially as described.

10. The combination, with the spring-actuated motor, and the clock mechanism, of the two sprocket-wheels 46 engaged by said clock mechanism, and the double escapement or flier 42 provided with the oppositely-arranged projections 43, adapted to engage said sprocket-wheels, substantially as described.

11. The combination, with the slotted record-sheet-holding cylinder, of the locking-bar 52 arranged to hold one edge of the edge of the sheet in position upon said cylinder, and a suitable shield arranged in proximity to said cylinder and adapted to hold the record-sheet against said cylinder, substantially as described.

12. The combination, with the record-sheet-holding cylinder, of the spring-markers, and a series of slides movable in a direction substantially at right angles to the direction of motion of said markers, to move said markers and to hold them against the paper, substantially as described.

13. The combination, with the record-sheet-holding cylinder, of the movable door, and a series of markers arranged upon said door, of a series of slides movable in a direction substantially at right angles to the direction of motion of said markers, substantially as described.

14. The combination, with the record-holding cylinders, of the series of spring-markers 67, a sliding stud 68, arranged to engage said markers, and the operating-slides 69, substantially as described.

15. The combination, in a time-recorder, with the record-sheet-holding cylinder, of the movable door 5, a series of spring-markers 67 arranged upon the inside of said door and adapted to engage said cylinders and a series of numbered operating-slides upon the outside of said door arranged to be moved in a direction substantially at right angles to the direction of motion of said markers, substantially as described.

In witness whereof I have hereunto set my hand this 18th day of March, 1902.

SEWARD A. DEAN.

In presence of—
 A. C. PAUL,
 C. G. HANSON.